(12) United States Patent
Leng (10) Patent No.: US 12,507,802 B2
(45) Date of Patent: Dec. 30, 2025

(54) STRUCTURAL BOARD AND TABLE (71) Applicant: New-Tec Integration (Xiamen) Co., Ltd., Xiamen (CN)

(72) Inventor: Luhao Leng, Xiamen (CN)

(73) Assignee: New-Tec Integration (Xiamen) Co., Ltd., Xiamen (CN)

( * ) Notice: Subject to any disclaimer, the term of this patent is extended or adjusted under 35 U.S.C. 154(b) by 133 days.

(21) Appl. No.: 17/900,910

(22) Filed: Sep. 1, 2022

(65) Prior Publication Data

US 2022/0408922 A1    Dec. 29, 2022

Related U.S. Application Data

(63) Continuation of application No. PCT/CN2021/087273, filed on Apr. 14, 2021.

(30) Foreign Application Priority Data

Apr. 24, 2020  (CN) .......................... 202010331407.8

(51) Int. Cl.
*A47B 13/08*       (2006.01)
*A47B 96/18*       (2006.01)
(Continued)

(52) U.S. Cl.
CPC ............ *A47B 96/206* (2013.01); *A47B 13/08* (2013.01); *A47B 96/18* (2013.01); *B32B 3/12* (2013.01);
(Continued)

(58) Field of Classification Search
CPC .................................. B32B 3/12; A47B 13/08
See application file for complete search history.

(56) References Cited

U.S. PATENT DOCUMENTS 3,011,602 A * 12/1961 Ensrud ...................... E04C 2/32
                                                          52/327
4,495,237 A *  1/1985 Patterson .............. E04C 2/3405
                                                          156/291
(Continued)

FOREIGN PATENT DOCUMENTS

CN        102987726 A       3/2013
CN        104856435 A       8/2015
(Continued)

OTHER PUBLICATIONS

International Search Report and English Translation cited in PCT/CN2021/087273, mailed Jun. 25, 2021, 5 pages.
(Continued)

*Primary Examiner* — Humera N. Sheikh
*Assistant Examiner* — Julia L Rummel
(74) *Attorney, Agent, or Firm* — Cooper Legal Group, LLC (57) ABSTRACT

A structural board comprises a surface board and a bottom board. The bottom board comprises a first supporting surface and a second supporting surface, and the surface board is fixedly connected on the second supporting surface. The bottom board comprises a plurality of protruding cavities spaced apart from one another. Two end surfaces of each of the plurality of protruding cavities along a protruding direction of the plurality of protruding cavities respectively defines the first supporting surface and the second supporting surface. Each of a plurality of straight ribs is defined by two adjacent, spaced apart protruding cavities of the plurality of protruding cavities. Some of the plurality of straight ribs are connected together in an extending direction, and the plurality of straight ribs with different extending directions extend to be cross-connected to one another to form a
(Continued)

polygonal mesh structure that defines the first supporting surface.

7 Claims, 6 Drawing Sheets

(51) Int. Cl.
*A47B 96/20* (2006.01)
*B32B 3/12* (2006.01)
*B32B 3/30* (2006.01)
*B32B 7/12* (2006.01)
*B32B 27/08* (2006.01)

(52) U.S. Cl.
CPC .................. *B32B 3/30* (2013.01); *B32B 7/12* (2013.01); *B32B 27/08* (2013.01); *B32B 2307/558* (2013.01); *B32B 2479/00* (2013.01)

(56) References Cited

U.S. PATENT DOCUMENTS

| | | | |
|---|---|---|---|
| 9,808,081 | B2 | 11/2017 | Leng |
| 2011/0005165 | A1* | 1/2011 | Stadthagen-Gonzalez ................. E04C 5/07 52/650.1 |
| 2014/0037910 | A1* | 2/2014 | Leng ...................... A47B 13/08 428/172 |

FOREIGN PATENT DOCUMENTS

| | | |
|---|---|---|
| CN | 208446885 U | 2/2019 |
| CN | 109419193 A | 3/2019 |
| CN | 112109389 A | 12/2020 |
| CN | 212666834 U | 3/2021 |
| WO | WO 8803086 A1 * | 5/1988 |

OTHER PUBLICATIONS

First Office Action cited in CN202010591098.8, mailed Jul. 13, 2024, 12 pages.
Second Office Action cited in CN202010591098.8, mailed Nov. 9, 2024, 12 pages.
Dezhong Miao, "Plastic Molding Process and Model Design", Published by: Beijing Institute of Technology, Dec. 31, 2014, 4 pages, including concise statement of relevance.
Rejection Decision received in corresponding Chinese patent application No. 202010591098.8, dated Jan. 23, 2025, 15 pages.

* cited by examiner

STRUCTURAL BOARD AND TABLE

RELATED APPLICATIONS

This application is a continuation of and claims priority to PCT patent application number PCT/CN2021/087273, filed Apr. 14, 2021, which claims priority to Chinese patent application number 202010331407.8, filed on Apr. 24, 2020. PCT patent application number PCT/CN2021/087273 and Chinese patent application number 202010331407.8 are incorporated herein by reference.

FIELD OF THE DISCLOSURE

The present disclosure relates to the field of furniture, and in particular to a structural board and a table.

BACKGROUND OF THE DISCLOSURE

The existing table board configured for making a table generally adopts laminated woods, plastic boards, or solid wood panels. For the table boards made of the laminated woods or solid wood panels, the weight is high, the cost is high, and mass production is not easy. The plastic table boards using a honeycomb structure comprise a surface board with a smooth outer surface and an inner surface and a reinforcing board with an upper surface and a lower surface. The upper surface of the reinforcing board has an array of protrusions. The array of protrusions is arranged at intervals in a horizontal direction of the upper surface and has a plane bonding surface that fits the inner surface. The surface board, the reinforcing board with the array of protrusions, and an outer peripheral reinforcement frame greatly simplify a structure of the table board made of composite material, which has considerable mechanical strength and low production costs. In the existing structure, the protrusions are basically cylindrical and are formed by vacuum forming. After the protrusions are sucked out on the reinforcing board, a larger plane is needed to maintain a certain strength. Therefore, the amount of material larger.

BRIEF SUMMARY OF THE DISCLOSURE

The present disclosure provides a composite structural board with a strong structure and light weight and a table or furniture using the structural board to solve the deficiencies in the background.

In order to solve the technical problem, a technical solution of the present disclosure is as follows.

A structural board comprises a surface board and a bottom board. The bottom board comprises a first supporting surface and a second supporting surface, and the surface board is fixedly connected on the second supporting surface. The bottom board comprises a plurality of protruding cavities spaced apart from one another at even intervals, each of the plurality of protruding cavities comprises two ends, and the first supporting surface and the second supporting surface respectively comprise two ends of each of the plurality of protruding cavities along a protruding direction of the plurality of protruding cavities. Each of a plurality of straight ribs is defined by two adjacent protruding cavities of the plurality of protruding cavities, and the plurality of straight ribs are divided into at least two groups. The at least two groups of the plurality of straight ribs respectively extend in different extending directions and are respectively connected together to substantially define linear lines, and the linear lines are cross-connected to one another to form a polygonal mesh structure that defines the first supporting surface.

In a preferred embodiment, the polygonal mesh structure is a triangular mesh structure, a quadrilateral mesh structure, a pentagonal mesh structure, or a hexagonal mesh structure.

In a preferred embodiment, the polygonal mesh structure is the quadrilateral mesh structure, and the quadrilateral mesh structure is a parallelogram mesh structure.

In a preferred embodiment, the parallelogram mesh structure is a square, rectangular, or diamond mesh structure.

In a preferred embodiment, each of the surface board and the bottom board is made of plastic.

In a preferred embodiment, the bottom board is formed by vacuum forming.

In a preferred embodiment, a cross-sectional area of each of the plurality of protruding cavities gradually decreases along the protruding direction of the plurality of protruding cavities, and an area of the bottom end is ⅓ to ⅔ of an area of a top opening of a corresponding one of the plurality of protruding cavities of the bottom board.

In a preferred embodiment, a bottom surface of the two ends of each of the plurality of protruding cavities that defines the second supporting surface is elliptical, circular, or quadrilateral.

In a preferred embodiment, the surface board is glued to the second supporting surface of the bottom board.

The present disclosure further provides a table, and the table comprises the structural board.

Compared with the existing techniques, the technical solution has the following advantages.

1. The first supporting surface of the bottom board has a polygonal mesh structure, and the surface board is fixedly connected on the second supporting surface. The polygonal mesh structure can strengthen the bottom board, evenly disperse the force acting on the bottom board, and increase strength of the structural board. The polygonal mesh structure is formed by the plurality of straight ribs. The first supporting surface of the bottom board defined by the plurality of straight ribs has a smaller area, and the material of the bottom board is formed on a side wall of the plurality of protruding cavities. Therefore, this structure having a larger area with respect to the first supporting surface compared to the conventional structure has advantages of high strength and material saving.

2. The bottom board is made of plastic, and the bottom board forms the plurality of protruding cavities by vacuum forming. The plurality of protruding cavities have a frustum structure, and the cross-sectional area of each of the plurality of protruding cavities along the protruding direction of the plurality of protruding cavities is gradually reduced, and the supporting strength of the plurality of protruding cavities is high. The area of the bottom end is ⅓ to ⅔ of the area of a top opening of a corresponding one of the plurality of protruding cavities of the bottom board. In this way, there is a larger supporting area with respect to the second support surface, and at the same time, sufficient taper is ensured, and there is a better diagonal support.

DETAILED DESCRIPTION OF THE EMBODIMENTS

The present disclosure will be further described below in combination with the accompanying drawings and embodiments.

Some directional terms used to describe the drawings, such as "inner", "outer", "above", "below", and other directional terms will be understood to have their normal meaning and refer to those directions involved in normal viewing of the drawings. Unless otherwise indicated, directional terms described herein substantially follow conventional directions as understood by those skilled in the art.

The terms "first", "second", and similar terms used in the present disclosure do not denote any order, quantity, or importance in the present disclosure, but are used to distinguish one component from other components.

Figure 1:
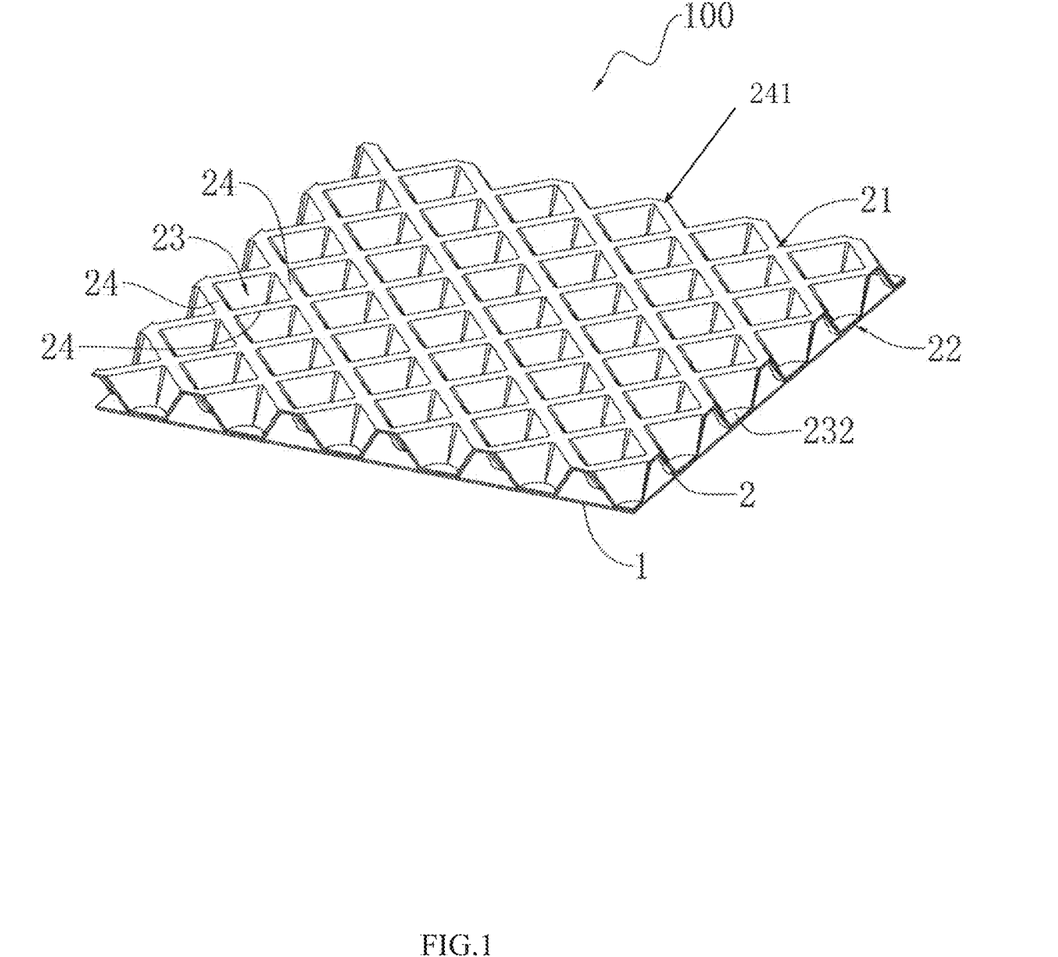
FIG. 1 illustrates a perspective view of a structural board of a preferred embodiment of the present disclosure.
Figure 2:
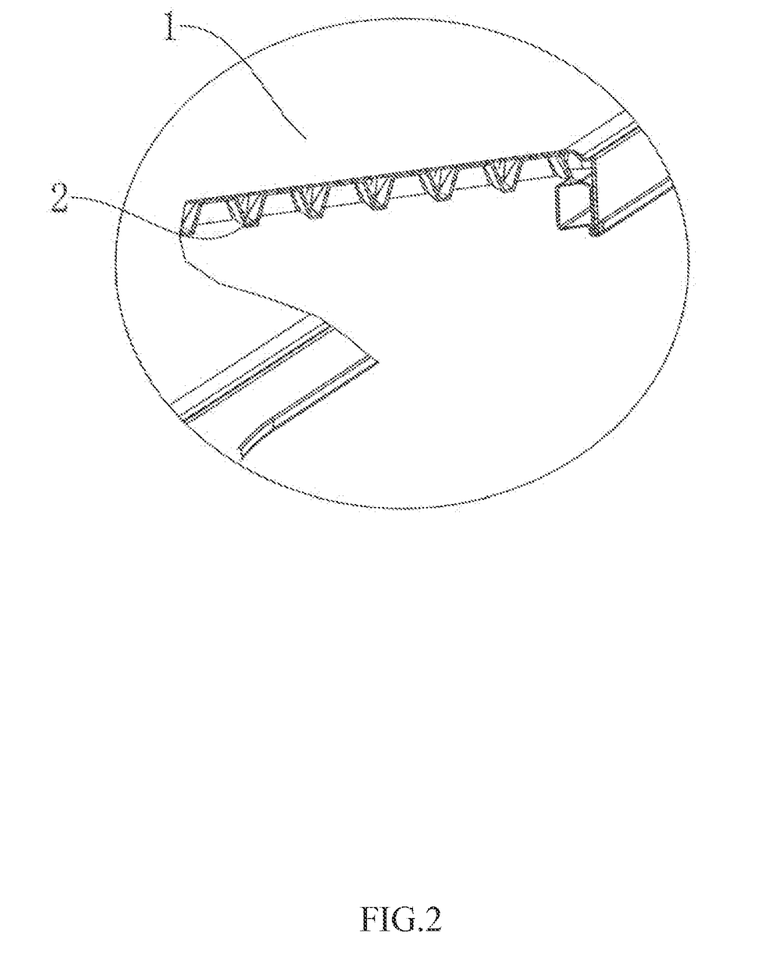
FIG. 2 illustrates a perspective, cross-sectional view of the structural board of a preferred embodiment of the present disclosure.

Referring to FIGS. 1 to 2, a structural board 100 is illustrated. The structural board 100 comprises a surface board 1 and a bottom board 2. The surface board 1 is a flat board. The bottom board 2 comprises a first supporting surface 21 and a second supporting surface 22, and the surface board 1 is fixedly connected on the second supporting surface 22. Furthermore, the surface board 1 is glued to the second supporting surface 22. In some simple replacements, the surface board 1 can be fixedly connected on the second supporting surface 22 through laser welding, and the first supporting surface 21 and the second supporting surface 22 are parallel to and separated from each other by a specific distance.

The bottom board 2 comprises a plurality of protruding cavities 23 spaced apart from one another at even intervals. Two ends of each of the plurality of protruding cavities 23 along a protruding direction of the plurality of protruding cavities 23 respectively define the first supporting surface 21 and the second supporting surface 22. The bottom board 2 further comprises a plurality of straight ribs 24, each of which is defined by two adjacent, spaced apart protruding cavities 23 of the plurality of protruding cavities 23. The plurality of straight ribs 24 are divided into at least two groups, and the at least two groups of the plurality of straight ribs 24 respectively extend in different extending directions and are respectively connected together to define (or substantially define) linear lines 241. The linear lines 241 are cross-connected to one another to form polygonal mesh structures that define the first supporting surface 21. A three-dimensional shape of each of the plurality of protruding cavities 23 is a frustum, which can be a truncated cone or a polygonal frustum. The number of the protruding cavities 23 is determined by a size of the bottom board 2, as long as the polygonal mesh structure can be formed and perform a supporting effect.

The polygonal mesh structure may be a triangular, quadrilateral, pentagonal, or hexagonal mesh structure. In the present disclosure, the polygonal mesh structure is a quadrilateral mesh structure. Preferably, the quadrilateral mesh structure is a parallelogram mesh structure. More preferably, the parallelogram mesh structure can be a square, rectangular, or diamond mesh structure, but the disclosure is not limited thereto.

Figure 3:
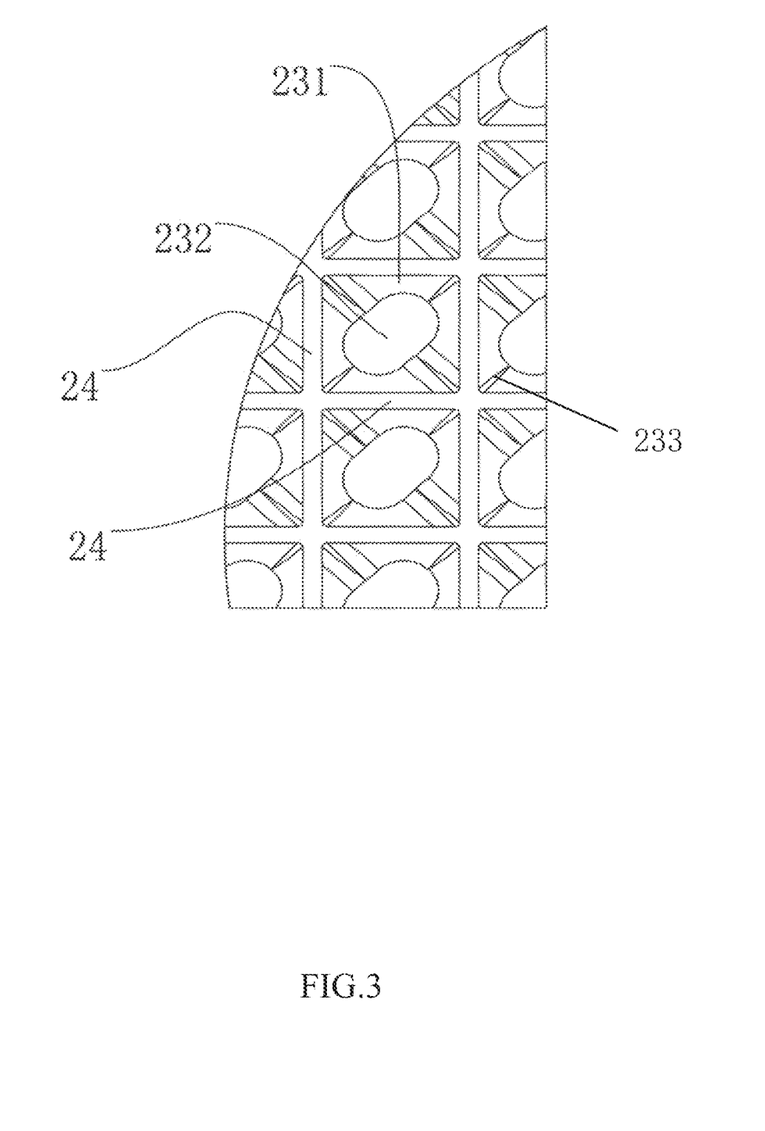
FIG. 3 illustrates a top view of the structural board of a preferred embodiment of the present disclosure, when an end of each of a plurality of protruding cavities is elliptical.
Figure 4:
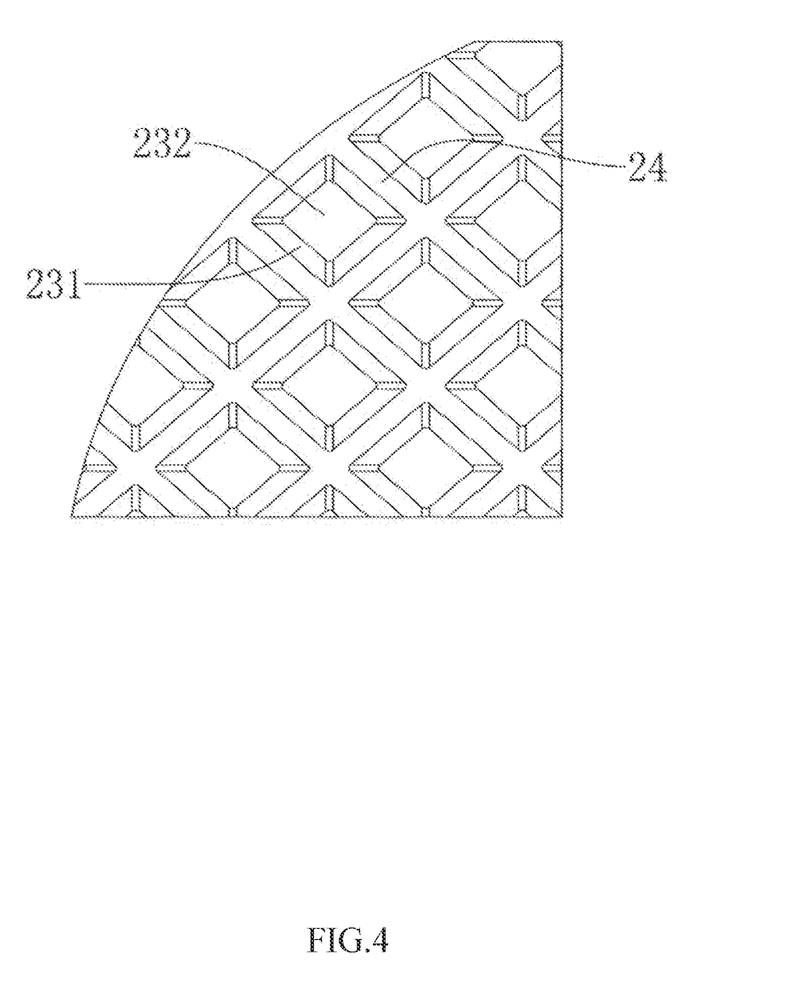
FIG. 4 illustrates a top view of the structural board of a preferred embodiment of the present disclosure, when an end of each of a plurality of protruding cavities is quadrilateral.
Figure 5:
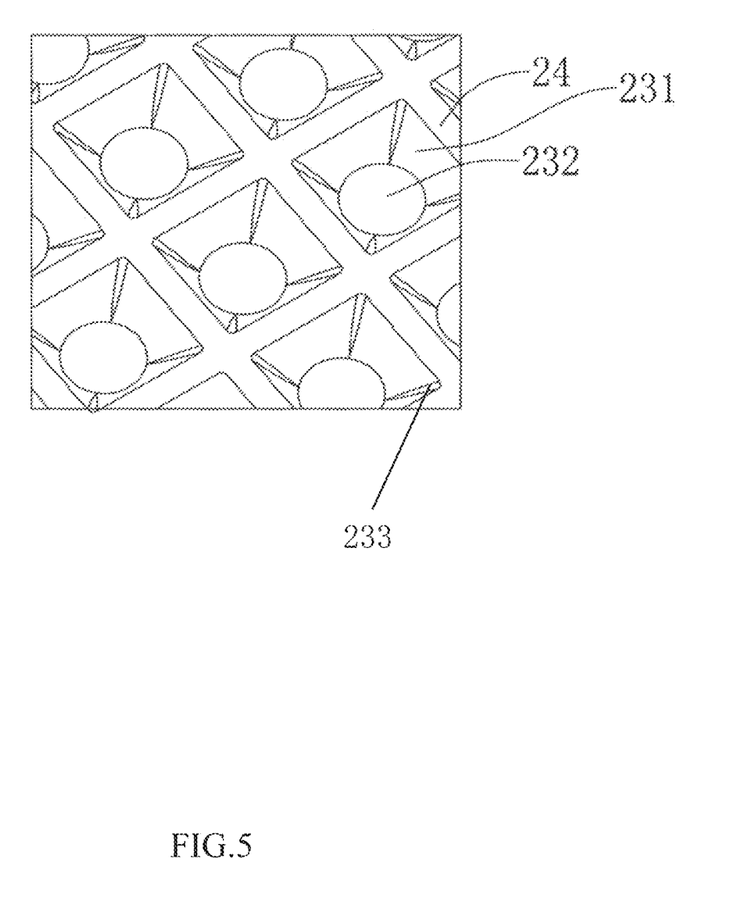
FIG. 5 illustrates a top view of the structural board of a preferred embodiment of the present disclosure, when an end of each of a plurality of protruding cavities is circular.

Referring to FIGS. 3-5, three embodiments of the present disclosure using the quadrilateral mesh structure are illustrated. Referring to FIG. 3, in this embodiment, the quadrilateral mesh structure is used. A bottom end 232 of the two ends of each of the plurality of the protruding cavities 23 that defines the second support surface 22 is elliptical. Referring to FIG. 4, in this embodiment, the quadrilateral mesh structure is used. The bottom end 232 of the two ends of each of the plurality of the protruding cavities 23 that defines the second support surface 22 is quadrilateral. Referring to FIG. 5, in this embodiment, the quadrilateral mesh structure is used. The bottom end 232 of the two ends of each of the plurality of the protruding cavities 23 that defines the second support surface 22 is circular.

It should be noted that each of the surface board 1 and the bottom board 2 is made of plastic, and the bottom board 2 is integrally formed by vacuum forming, which has advantages of low cost and fast processing. A cross-sectional area of each of the plurality of protruding cavities 23 gradually decreases along the protruding direction of the plurality of protruding cavities 23, which is conducive to release of the bottom board 2 during vacuum forming, and a frustum shape has better support. Specifically, each of the plurality of protruding cavities 23 in the quadrilateral mesh structure comprises four connecting inclined flat walls 231 respectively connecting four straight ribs 24 of the plurality of straight ribs 24 and the bottom end 232 that may be elliptical, circular, or quadrilateral. When a heavy object impacts the surface board 1, the four connecting inclined flat walls 231 can deform and absorb the impact. In some simple replacements, the cross-sectional area of each of the plurality of protruding cavities 23 can be constant along the protruding direction of the plurality of protruding cavities 23. For example, when the bottom board 2 is small, the bottom board 2 can be manufactured by injection molding, and the demolding slope is required to be small.

The connecting inclined flat walls 231 are connected to each other using inclined flat ribs 233 with decreasing dimension along a direction from the first supporting surface 21 to the second supporting surface 22.

Figure 6:
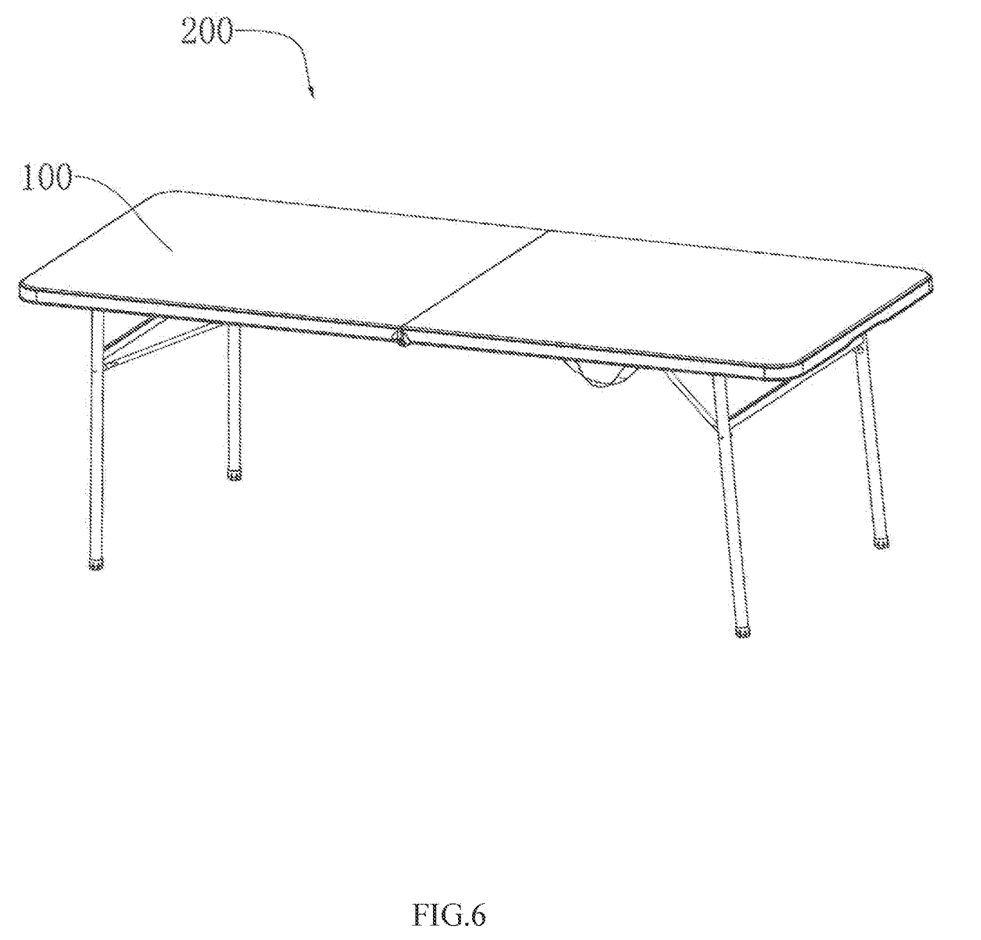
FIG. 6 illustrates a perspective view of a table using the structural board of a preferred embodiment of the present disclosure.

Referring to FIG. 6, the present disclosure also provides a table 200 using the structural board 100 described above. The surface board 1 is configured to bear heavy objects, and legs of the table 200 are connected to the bottom board 2. In other applications, the structural board 100 can be used for building wall panels, floors, temporary roads, or any other need for flat support items.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A table comprising a table board, the table board comprising:
a surface board, and
a bottom board, wherein:
the bottom board is plastic,
the surface board is planar,
the bottom board comprises a first supporting surface and a second supporting surface,
the surface board is directly fixedly connected on the second supporting surface,
the bottom board comprises a plurality of protruding cavities spaced apart from one another,
a three-dimensional shape of each of the plurality of protruding cavities is a frustum,
an area of the second supporting surface is ⅓ to ⅔ of an area of bottom openings of the plurality of protruding cavities,
each of the plurality of protruding cavities comprises two ends,
the first supporting surface and the second supporting surface respectively comprises the two ends of each of the plurality of protruding cavities along a protruding direction of the plurality of protruding cavities,
each of a plurality of straight ribs is defined by two adjacent protruding cavities of the plurality of protruding cavities,
the plurality of straight ribs are divided into at least two groups,
the at least two groups of the plurality of straight ribs respectively extend in different extending directions and are respectively connected together to define straight linear lines having same widths,
the straight linear lines are cross-connected to one another to form a polygonal mesh structure that defines the first supporting surface,
each of the plurality of protruding cavities comprises connecting inclined walls respectively connecting corresponding straight ribs of the plurality of straight ribs and a top end of the two ends of a corresponding one of the plurality of protruding cavities in the second supporting surface, and
the connecting inclined walls are connected to each other using inclined ribs such that, the inclined ribs are located at corners between adjacent connecting inclined walls in the plurality of protruding cavities and extend from intersections between adjacent straight ribs of the plurality of straight ribs in the polygonal mesh structure.

2. The table according to claim 1, wherein:
the polygonal mesh structure is a triangular mesh structure, a quadrilateral mesh structure, a pentagonal mesh structure, or a hexagonal mesh structure.

3. The table according to claim 2, wherein:
the polygonal mesh structure is the quadrilateral mesh structure, and the quadrilateral mesh structure is a parallelogram mesh structure.

4. The table according to claim 1, wherein:
a cross-sectional area of each of the plurality of protruding cavities gradually decreases along the protruding direction of the plurality of protruding cavities.

5. The table according to claim 1, wherein:
the surface board is glued to the second supporting surface of the bottom board.

6. The table according to claim 1, wherein the connecting inclined walls comprise four connecting inclined walls.

7. The table according to claim 1, wherein
dimensions of the inclined ribs decrease along a direction from the first supporting surface to the second supporting surface.

* * * * *